Patented Jan. 9, 1940

2,186,754

UNITED STATES PATENT OFFICE 2,186,754

PURIFICATION OF AROMATIC NITRILES

Vito Giambalvo, Brooklyn, N. Y., assignor to Interchemical Corporation, New York, N. Y., a corporation of Ohio No Drawing. Application August 23, 1938, Serial No. 226,258

2 Claims. (Cl. 260—465)

This invention relates to a method of separating pure aromatic di-nitriles from a mixture of aromatic imides and aromatic di-nitriles.

Phthalonitrile (orthodicyanobenzene) and other aromatic di-nitriles may be prepared by use of the standard reaction for the production of nitriles from acid amides, by treating phthalamide or phthalimide with ammonia, preferably in the vapor phase, in the presence of a catalyst. The crude reaction product has been purified in the past by stirring the broken up reaction product with caustic soda solution to dissolve the unconverted phthalimide and other reaction products, and the phthalonitrile has been recovered by filtration. The difficulty with this method is that the caustic soda hydrolyzes the phthalimide to phthalic acid, so that recoveries of phthalimide are poor. This materially increases the cost of the phthalonitrile, since the ordinary crude mixtures rarely contain over 50% of phthalonitrile.

I have discovered that if a crude mixture of phthalonitrile and phthalimide, such as is obtained by reacting phthalamide or phthalimide with ammonia in the presence of a catalyst, is treated with very cold, very dilute caustic alkali, such as sodium or potassium hydroxide, the phthalimide may be recovered as such without hydrolysis, while the phthalonitrile remains behind as an insoluble precipitate.

I have found that the caustic alkali should be used in concentration of 5% or lower, and the treatment of the crude mixture must take place at 5° C. or lower.

As a typical example of my invention, I reacted the vapors obtained by heating 164 pounds of phthalamide, with 30 pounds of gaseous ammonia, carrying the mixture over a catalyst comprising diatomaceous earth, maintaining the reaction zone at 400° C. The crude mixture weighing 137 pounds resulting contained about 50% phthalonitrile, and about 50% of phthalimide, slightly contaminated with other reaction products. This mixture was broken up, and treated with 950 pounds of a 2% caustic soda solution at −1° C., while stirring was continued for ten minutes, and the slurry was filtered and washed alkali free with water. Recovery of the phthalonitrile (M. P. 140–142° C.) was theoretical.

The cold alkaline filtrate was then acidified with cold 10% sulfuric acid. The precipitated imide was filtered, and washed acid free. The recovery was about 95% of theoretical, and I have obtained recoveries of about 98%.

By my method, it is thus possible to obtain almost completely pure phthalonitrile, with substantially no loss of the original starting product.

The method may likewise be used with other aromatic di-nitriles. Thus, I have reacted naphthalimide and ammonia in the vapor phase at 450° C. over conventional catalysts, to obtain a crude reaction mixture, which was then treated as above, with substantially the same yield and results.

Substituted aromatic di-nitriles may also be prepared, provided the substituent is not a group which reacts readily with caustic soda, and provided it does not make the compound water soluble. Thus, halogenated di-nitriles can be purified by my method, but hydroxy substituted products cannot.

As indicated above, if temperatures higher than 5° C., or concentrations above 5% are used, substantial hydrolysis of the imide to the acid takes place, the rate of conversion increasing with increasing concentration and temperature. The acidulation of the filtrate should, of course, be carried out as soon as possible, in order to minimize the risk of hydrolysis.

What I claim is:

1. The method of separating a mixture of an aromatic imide and a water- and dilute alkali-insoluble aromatic di-nitrile, which comprises dissolving the imide in an aqueous caustic alkali solution of no greater than 5% concentration, at a temperature not above 5° C., separating the solid di-nitrile from the imide solution, and precipitating the imide.

2. The method of separating a mixture of phthalimide and phthalonitrile, which comprises dissolving the imide in an aqueous caustic alkali solution of no greater than 5% concentration, at a temperature not above 5° C., separating the solid di-nitrile from the imide solution, and precipitating the imide.

VITO GIAMBALVO.